United States Patent [19]
Trocciola et al.

[11] 3,847,672
[45] Nov. 12, 1974

[54] FUEL CELL WITH GAS SEPARATOR

[75] Inventors: John C. Trocciola, Glastonbury; Myles A. Walsh, III, Vernon, both of Conn.

[73] Assignee: United Aircraft Corporation, East Hartford, Conn.

[22] Filed: Aug. 18, 1971

[21] Appl. No.: 172,652

[52] U.S. Cl. ............... 136/86 C, 136/86 F, 55/16, 55/158
[51] Int. Cl. ......................................... H01m 27/14
[58] Field of Search ............... 136/86 C; 55/16, 158

[56] References Cited
UNITED STATES PATENTS

| | | | |
|---|---|---|---|
| 3,615,839 | 10/1971 | Thompson et al. | 136/86 C |
| 2,901,524 | 8/1959 | Goien et al. | 136/86 E |
| 2,699,836 | 1/1955 | Barton, Jr. | 55/158 |
| 3,241,293 | 3/1966 | Pfefferle | 55/158 |
| 3,309,229 | 3/1967 | Delfino | 136/86 DD |
| 3,436,271 | 4/1969 | Cole et al. | 136/86 E |
| 3,120,456 | 2/1964 | Broers | 136/86 R |

Primary Examiner—A. B. Curtis
Attorney, Agent, or Firm—A. W. Breiner

[57] ABSTRACT

A fuel cell system comprising an anode, a cathode, and an electrolyte in combination with a gas separator is described. The gas separator comprises a tile or block of salt in molten or solid state having opposed reactive surfaces. The salt is a mixture of $MxO + MxCO_3$ where M is an element such as an alkali or alkaline earth metal. A gas stream containing a fuel gas (hydrogen) and $CO_2$ is fed to one surface of the salt tile or block at which surface the carbon dioxide is chemically taken up by the salt. A sweep or stripping gas is maintained at the downstream surface of the salt tile or block at which surface carbon dioxide is released, and carried away by the sweep gas, for subsequent cycling to the cathode of the cell if desired to reduce concentration polarization of the cell.

9 Claims, 4 Drawing Figures

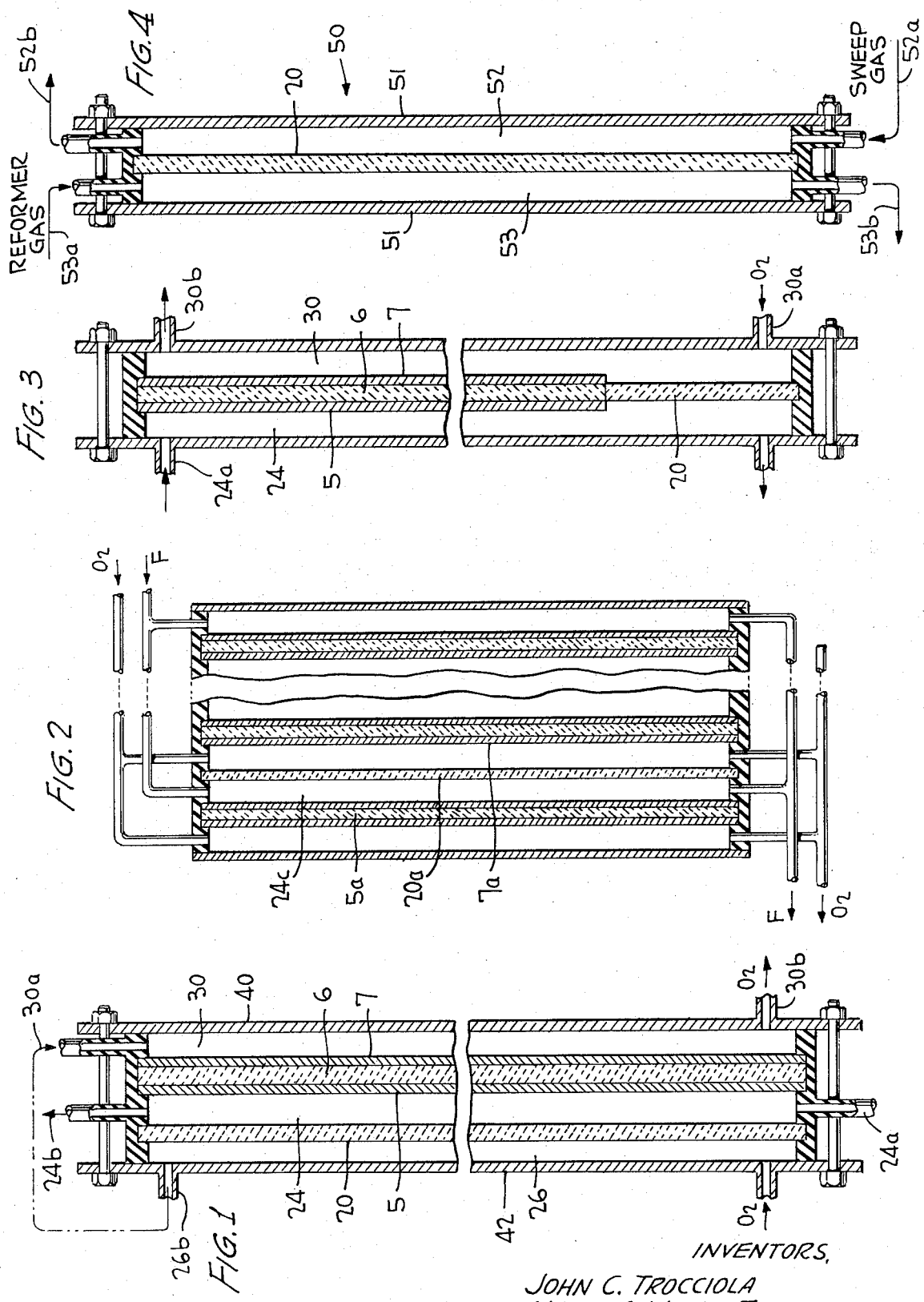

FUEL CELL WITH GAS SEPARATOR

FIELD OF INVENTION AND BACKGROUND

This invention is directed to an improved fuel cell system capable of operation on impure fuel reactants of the type originating in a hydrocarbon reform unit. More particularly, the invention is directed to a fuel cell comprising a fuel electrode, an oxidant electrode, and an electrolyte in combination with means for separating carbon dioxide from a fuel gas being fed to the fuel electrode and, if desired, circulating the separated carbon dioxide to the cathode of the cell to reduce concentration polarization.

A fuel cell, as the term is employed herein, designates an electrochemical cell for the direct generation of electrical energy from a fuel and oxidant. With such cells it is not necessary to go through the usual conversion of chemical energy to heat energy to mechanical energy to electrical energy as is common with heat engines. Such cells in their most simplified design comprise a housing, an oxidant electrode, a fuel electrode, and an electrolyte. In operation it is necessary that the fuel and oxidant contact a surface of their respective electrodes where a process of absorption and desorption occurs leaving the electrodes electrically charged with the second surface of the electrodes being in contact with the electrolyte. Depending upon the nature of the electrolyte, ions are transferred through the electrolyte from the anode to the cathode or from the cathode to the anode. Electrical current is withdrawn from the cell and passed through a suitable load where work is accomplished.

Pure hydrogen is generally considered the most desirable fuel for utilization in a fuel cell from the standpoint of electrochemical activity and for a high electrical energy to density ratio. However, pure hydrogen is relatively expensive and, furthermore, presents logistic problems in transport and storage. Accordingly, fuel cell systems have been designed for operation with a gaseous stream flowing directly from a hydrocarbon reformer or hydrogen generator. Although fuel electrodes are available which are carbon monoxide tolerant and which will consume carbon monoxide and hydrocarbon impurities which are present in the gaseous stream with hydrogen, carbon dioxide which is also present in substantial quantities causes severe concentration polarization at the anode (fuel electrode) of the cell and, further, precludes the use of alkaline electrolytes in the cell due to reaction of the $CO_2$ with such electrolytes, forming precipitates which block the electrode pores and otherwise adversely affect cell performance. In the prior art, efforts to avoid the detrimental affects of carbon dioxide have included the use of gas separators such as non-porus palladium/silver membranes between the fuel source and the fuel electrode which preferentially or selectively diffuse hydrogen. Although these units are generally acceptable from the standpoint of performance, the membranes are costly and the units are limited in performance due to the increased partial pressure of carbon dioxide due to its build-up in the environment of the separator with resultant decrease in hydrogen partial pressure. Other suggested solutions to decrease concentration polarization as a result of $CO_2$ in the fuel stream include the periodic reversal of reactant flow, i.e., pass oxidant to the "anode" and fuel to the "cathode," so that the tendency to promote concentration polarization is reversed and, hence, neutralized. This technique requires that the electrochemical cell be completely reversible, i.e., the electrode surfaces must function equally well as a fuel electrode or as an oxidant electrode. This is not practical technically or economically. Another proposed technique for compensating concentration polarization requires the addition of carbon dioxide to the oxidant gas side of the fuel cell to reform carbonate build-up and attain an equilibrium with the carbon dioxide at the fuel gas side of the cell. All of the aforesaid solutions, however, have varying shortcomings.

OBJECTS AND GENERAL DESCRIPTION

Accordingly, a primary object of the present invention is the construction of an improved fuel cell system comprising a fuel cell for operation on reform or impure gas containing carbon dioxide in combination with carbon dioxide separator means.

It is another object of this invention to provide an improved fuel cell system comprising a fuel cell for operation on reform gas in combination with carbon dioxide separator means including means for circulating the separated carbon dioxide to the oxidant electrode to reduce concentration polarization.

It is another object of this invention to provide a gas separator system for removal of carbon dioxide from a gas stream which is efficient and which maintains a high gas partial pressure of the gas being retained in the stream.

It is another object of this invention to provide an integral fuel cell and carbon dioxide separator system which is compact, efficient, and relatively economical.

These and other objects of the present invention will be fully apparent from the following detailed description, with particular emphasis being placed on the embodiments illustrated in the drawing.

The objects of the present invention are accomplished by constructing a fuel cell unit for operation in combination with a reformer or fed with impure or reform gas comprising a molten or solid salt tile or block having two opposed reactive surfaces in co-operative association with the fuel electrode of a fuel cell. Tile or block, as the terms are employed herein, designate a self-supporting layer of molten salt, whether the salt is present as a self-sustaining matrix or impregnated in a matrix such as alumiunum oxide, magnesium oxide, calcium oxide, or other material. It is essential that the tile or block contain opposed reactive surfaces. In operation, one surface of the salt tile is in fluid contact with a gas stream containing hydrogen, carbon dioxide, etc. As the carbon dioxide contacts the reactive tile surface, it reacts with the surface according to the formula

$$MxO + CO_2 \longrightarrow MxCO_3$$

removing carbon dioxide from the gas stream. The carbon dioxide in the gas phase reacts with the metallic oxide since the partial pressure of carbon dioxide in the gas phase is higher than the equilibrium partial pressure of carbon dioxide over the salt. A stripping or sweep gas is continuously passed in contact with the reactive surface downstream from the surface in contact with the gas stream where the reverse reaction $$MxCO_3 \longrightarrow MxO + CO_2$$

takes place. As is apparent, in these equations M designates the metal element of the salt, and x will be determined by the valence of the metal, i.e., one if the metal has a valance of two, or two if the metal has a valence of one. This reaction takes place at the opposed surface since the equilibrium partial pressure of carbon dioxide over the salt is higher than the partial pressure of carbon dioxide in the stripping gas. The net result of the two reactions is the transfer of carbon dioxide from the gas stream to the sweep or stripper gas. As a result of the removal of carbon dioxide from the gas stream and from the vicinity of the salt tile, the partial pressure of the remaining gases, i.e., hydrogen, etc., is effectively increased providing more efficient reaction at the anode of the cell. The strip gas containing the carbon dioxide is preferably cycled to the oxidant side of the cell where it is fed directly to the cathode. The carbon dioxide present for reaction at the cathode prevents concentration polarization.

The present invention can be employed in various embodiments as will be developed hereinafter with most prior art fuel cell systems. However, the invention is particularly adapted to molten carbonate cells, especially the internal reform varsion, since the gas separator operates in the same temperature range as such cells, i.e., 250° to 750°C. Particularly in view of the compatibility of operating temperatures, it is feasible to thermally integrate the gas stripper into the fuel cell stack and transfer the $CO_2$ from the anode chamber where it is a reaction product to the cathode chamber where it is a reactant. Furthermore, the concentration polarization due to $CO_2$ formation at the anode is particularly critical in alkali or alkaline earth carbonate cells increasing the attractiveness of cycling carbon dioxide from the anode chamber to the cathode.

The advantages of the presently described system, however, extend to most all systems utilizing impure hydrogen. The presently described carbon dioxide stripper operates at a high temperature and, accordingly, is not affected by problems associated with low temperature strippers including water balance and precipitation of solids. The high operating temperature of the device increases the carbon dioxide transfer capabilities of a unit of any given size over low temperature devices. The device is capable of operating at low pressures in contrast to operating pressures necessary in other types of separators such as non-porous palladium/silver alloy membrane hydrogen purification devices. The unit is relatively inexpensive in comparison to the aforesaid palladium/silver alloy purifiers.

The molten or solid salts which are operable in accordance with the present invention generally include mixtures of alkali and alkaline earth oxides and alkali and alkaline earth carbonates. Preferably, the metal oxide and metal carbonate will be present in substantially stoichiometric amounts. Preferred salt systems are $CaO + CaCO_3$; $BaO + BaCO_3$; $SrO + SrCO_3$; $LiO + Li_2CO_3$; $CaO + LiCO_3$; $LiO + CaCO_3$; $LiO + CaO + LiCO_3 + CaCO_3$, and mixtures thereof. The selection of the salt will be governed by the environment of use as, for example, the operating conditions of the fuel cell.

DRAWING AND SPECIFIC EMBODIMENTS

To more specifically illustrate the invention, reference is made to the drawing wherein FIG. 1 is a transverse sectional view of a single cell utilizing a carbon dioxide stripper in accordance with the present invention;

FIG. 2 is a transverse sectional view of an embodiment comprising a plurality of cells;

FIG. 3 is a transverse sectional view of the alternative embodiment of the invention illustrating a single cell unit; and FIG. 4 is a transverse sectional view of a gas separator which can be integrated into a fuel cell stack.

In the drawing, like parts are designated by like numerals.

Referring to FIG. 1, the fuel cell system comprises an anode 5, a cathode 7, a molten sodium carbonate electrolyte contained in a zirconium oxide matrix 6. Electrodes 5 and 7 are palladium/gold alloy discs in intimate contact with the electrolyte matrix. The electrolyte matrix is approximately 25 mils in thickness and the electrodes are each approximately 7 mils in thickness. One end wall 40 of the cell housing in combination with cathode 7 forms oxidant chamber 30. Salt tile 20 which is a stoichiometric admixture of $CaO + CaCO_3$ retained in a porous zirconium oxide matrix is spaced from anode 5 forming a chamber 24 for passage of a reform or other impure gaseous stream fed, for example, from a reformer. Tile 20 and end wall 42 of the cell housing form chamber 26 for passage of a sweep gas which removes the carbon dioxide from the environment of the salt tile.

In operation, the cell is heated to an operating temperature of about 550°C. A reformer gas is fed through inlet 24a to a reactant chamber 24 where the carbon dioxide diffuses through membrane 20 into gas passage 26. Hydrogen and other consumable fuels are consumed at anode 5 with excess fuel being vented through exit 24b for re-cycling if desired. Carbon dioxide is released from the downstream side of tile 20 and carried by the sweep gas, in this instance air, through outlet 26b and fed to chamber 30 and cathode 7 through inlet 30a. Excess oxidant is vented through outlet 30b. As a result of the continuous removal of carbon dioxide from the reactant gas, anode 5 retains its high electrochemical activity. The carbon dioxide which is recovered from the fuel gas stream and fed to cathode 7 serves to maintain a carbon dioxide balance within the system, further limiting the concentration polarization of the cell.

In FIG. 2 an alternative embodiment is illustrated in which a plurality of cells as defined at FIG. 1 are tied together as a stack. As seen from the drawing, a reform gas is fed into chamber 24c where the hydrogen and consumable gases are immediately contacted with anode 5a. Carbon dioxide which migrates through salt tile 20a is consumed by cathode 7a of an adjacent cell of the stack. In the embodiment shown in FIG. 2, for simplicity, the end cells of the stack are not fully integrated with the gas separator.

FIG. 3 is an alternative embodiment of a fuel cell in accordance with the invention. A reform gas is fed through inlet 24a into chamber 24 where it immediately contacts anode 5. Below the active end of the cell, i.e., the extension beyond the active electrodes, the gas stream contacts salt tile 20 with the carbon dioxide being taken up by the tile. Oxidant which is fed into chamber 30 and to cathode 7 through inlet 30a sweeps the carbon dioxide away from salt tile 20 and to cathode 7 where it is available for reaction. Excess oxidant is vented through exit 30b.

FIG. 4 illustrates a gas separator 50 capable of being integrated into a fuel cell stack. The gas separator comprises housing 51 and gas chambers 52 and 53. A reform gas is fed into chamber 53 through inlet 53a with gas depleted of carbon dioxide being removed at outlet 53b. This gas is available for feeding to the fuel electrodes of a fuel cell stack. Carbon dioxide which is taken up at the gas stream side of salt tile 20 is released on the downstream side and into chamber 52 where it is carried away by the sweep gas which enters chamber 52 through inlet 52a and out through outlet 52b where it is fed to the oxidant electrodes of a fuel cell stack. Accordingly, a single gas separator can service a fuel cell stack comprising up to twelve or more individual cells. This gas separator can be constructed integral with the fuel cell stack; integral with a reform unit or spaced therebetween. The unit provides an efficient and economical device for removing carbon dioxide from a fuel stream.

Although the present invention has been described with reference to porous disc electrodes, other electrodes can be employed in the fuel cells described herein including porous metal sinters or electrodes electrolytically plated or flame sprayed onto an electrolyte matrix. Furthermore, the invention can be utilized with reference to fuel cells employing a free-flowing electrolyte in additon to the molten carbonate electrolytes. Moreover, matrix-type electrolytes retaining an aqueous electrolyte within a hydrophilic matrix can be utilized in accordance with this invention. Particularly in instances where the gas/carbon dioxide separator is external of the fuel cell stack the invention can be utilized in fuel cells operating at low temperatures and the like. As will be apparent to one skilled in the art, various modifications in addition to those described above can be made in the over-all cell design to meet operating conditions. These modifications being within the ability of one skilled in the art are to be covered herein with the invention only being limited in accordance with the appended claims.

It is claimed:

1. A fuel cell system comprising a fuel cell including an anode, a cathode, and an electrolyte constructed and arranged in operative association with a gaseous carbon dioxide separator including a salt tile comprising an admixture of an alkali or alkaline earth oxide and an alkali or alkaline earth carbonate having two opposed surfaces, means for bringing a reform gas in contact with one opposed surface of said salt tile, means for bringing a sweep gas in contact with the second opposed surface of said salt tile, and means for providing said reform gas after contacting said one opposed surface of said salt tile to said anode.

2. A fuel cell comprising in combination a fuel electrode, an oxidant electrode, an electrolyte separating said electrodes, a substantially gas-impermeable, unitary salt tile comprising an admixture of alkali or alkaline earth oxide and an alkali or alkaline earth carbonate having two opposed surfaces spaced from said fuel electrode and forming a first gas chamber therewith, a gas passage at the second opposed surface of said salt tile, means for feeding an oxidant to said oxidant electrode, means for feeding a reform gas into said first chamber and means for feeding a sweep gas into said second chamber.

3. The fuel cell system according to claim 2 wherein the electolyte separating said electrodes is a molten carbonate electrolyte and said system including means for cycling a gas from said second chamber to said means for feeding an oxidant to said oxidant electrode.

4. The fuel cell system of claim 2 wherein the salt tile is an admixture of $CaO$ and $CaCO_3$.

5. The fuel cell system of claim 2 wherein the salt tile is an admixture of $SrO$ and $Sr\ CO_3$.

6. The fuel cell system of claim 2 wherein the salt tile is an admixture of $BaO$ and $BaCO_3$.

7. The fuel cell system of claim 2 wherein the salt tile is an admixture of $LiO$ and $Li_2CO_3$.

8. The fuel cell system of claim 2 wherein the salt tile is an admixture of $LiO$ and $CaCO_3$.

9. The fuel cell system of claim 2 wherein the salt tile is an admixture of $LiO$, $CaO$, $LiCO_3$, and $CaCO_3$.

* * * * *